Patented Jan. 5, 1937

2,067,137

UNITED STATES PATENT OFFICE 2,067,137

SOLVENT REFINING OF MINERAL OIL

Louis A. Clarke, Fishkill, N. Y., assignor to The Texas Company, New York, N. Y., a corporation of Delaware No Drawing. Application May 7, 1935,
Serial No. 20,192

2 Claims. (Cl. 196—13)

This invention relates to refining hydrocarbon oil, and more particularly to refining mineral oil by solvent extraction.

The invention broadly contemplates refining mineral oil with a selective solvent to remove undesired constituents and produce therefrom refined products having desired characteristics.

The invention has particular reference to the treatment of mineral oil with a solvent selected from the acetyl mono- and di- methyl and ethyl amines, such as acetyl methyl amine and acetyl ethyl amine. Acetyl di-ethyl amine, for example, has the following chemical formula:

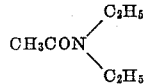

I have discovered that the foregoing solvent liquids are suitable for extracting undesired constituents from mineral oils, and that they are adapted to the extractive treatment of lubricating oil fractions for the manufacture therefrom of lubricating oil products characterized by high viscosity index.

I have found that these solvent liquids, when mixed with lubricating oil fractions under suitable conditions of temperature and proportion of solvent to oil, effect separation of the oil into so-called paraffinic and non-paraffinic portions. The non-paraffinic portion comprises relatively low viscosity index constituents of the oil, such as naphthenic, aromatic and unsaturated hydrocarbon bodies.

In treating lubricating oil stock with the solvent liquid of my invention for the production of high viscosity index lubricating oil, one part of the oil is mixed with from one to four parts of solvent liquid at a temperature of from 30° F. to 200° F. This mixture, after thorough agitation, is separated into extract and raffinate phases.

The extract phase which forms the lower layer comprises the relatively low viscosity index constituents of the oil dissolved in the bulk of the solvent liquid, while the upper layer, or raffinate phase, comprises the high viscosity index constituents of the oil mixed with some of the solvent liquid.

The two phases are separated, and the solvent liquid removed therefrom, either by distillation or by washing with a suitable solvent liquid.

The temperature as well as the ratio of solvent to oil employed in carrying out the extraction treatment may be varied for the purpose of effecting the particular degree of extraction desired and will, of course, also depend on the nature of the oil undergoing treatment.

By way of a specific example, an untreated dewaxed lubricating distillate, derived from Mid-Continent crude, was extracted with acetyl diethyl amine in a batch type of operation. This lubricating distillate had tests as indicated below.

One part of the above oil was extracted with two parts of the solvent liquid at a temperature of 78° F. The mixture was separated into extract and raffinate phases, and the solvent liquid was recovered therefrom by distillation. The resulting raffinate oil had the following tests as compared with the oil before extraction:

|  | Raffinate | Charge |
|---|---|---|
| Gravity A. P. I. | 25.6 | 21.3. |
| Saybolt Universal viscosity: | | |
| At 100° F | 815 sec | 1,236 sec. |
| At 210° F | 72 sec | 80.5 sec. |
| Viscosity index | 72.5 | 51. |
| Carbon residue percent | .25 | .69. |

This raffinate oil amounted to 75% of the original oil charged and, as indicated above, had a viscosity index of 72.5, as compared with a viscosity index of 51, for the original oil before extraction.

In some instances, it may be of advantage to carry out the extraction in the presence of a modifying solvent liquid, such as benzol, or a light petroleum fraction, such as naphtha, or a petroleum fraction comprising mainly normally gaseous hydrocarbons, such as propane or butane.

The lubricating oil distillate may be subjected to the extraction treatment, either before or after dewaxing, and also either before or after treatment with other solvents or chemicals.

Furthermore, the invention is not necessarily limited to distillate lubricating oil fractions, since the solvent may be adapted to the refining and purification of either distillate or residual fractions of mineral oil. It is also adapted to the treatment and purification of fractions other than lubricating oil fractions as, for example, naphtha, kerosene, etc.

While acetyl amines, which are derivatives of acetamide, have been mentioned, it is contemplated that the corresponding compounds derived from formamide may also be employed. The latter are stable and do not decompose when subjected to distillation during removal of the solvent from the treated oil. In this respect, they differ from the parent substance, formamide, which tends to decompose when heated and, in addition, has low solvent power for oil.

Obviously, many modifications and variations of the invention, as hereinbefore set forth, may be made without departing from the spirit and scope thereof, and therefore only such limitations should be imposed as are indicated in the appended claims.

I claim:

1. The method of separating viscous lubricating oil containing high viscosity and low viscosity index constituents into fractions which are relatively rich in high viscosity index and low viscosity index constituents which comprises mixing the oil with a solvent selected from the group consisting of acetyl methyl, acetyl ethyl and acetyl di-ethyl amine, forming an extract phase containing low viscosity index constituents dissolved in the solvent liquid, and a raffinate phase comprising the relatively high viscosity index constituents, and separating the two phases.

2. The method of separating hydrocarbon oil containing high viscosity and low viscosity index constituents into fractions which are relatively rich in high viscosity index and low viscosity index constituents which comprises mixing the oil with acetyl di-ethyl amine, forming an extract phase containing low viscosity index constituents dissolved in the solvent liquid, and a raffinate phase comprising the relatively high viscosity index constituents, and separating the two phases.

LOUIS A. CLARKE.